United States Patent
Giesler et al.

(10) Patent No.: US 11,931,915 B2
(45) Date of Patent: Mar. 19, 2024

(54) CUTTING APPARATUS FOR CUTTING A SUBSTANTIALLY V-SHAPED STRIP FROM MEAT PRODUCTS FED IN A TRANSPORT DIRECTION T AND METHOD AND APPARATUS FOR REMOVING A SUBSTANTIALLY V-SHAPED STRIP FROM MEAT PRODUCTS FED IN A TRANSPORT DIRECTION T HAVING SUCH A CUTTING APPARATUS

(71) Applicant: Nordischer Maschinenbau Rud. Baader GmbH + Co. KG, Lübeck (DE)

(72) Inventors: Stefan Giesler, Lübeck (DE); Torsten Rusko, Herrnburg (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 369 days.

(21) Appl. No.: 17/438,199

(22) PCT Filed: Apr. 9, 2019

(86) PCT No.: PCT/EP2019/058971
§ 371 (c)(1),
(2) Date: Sep. 10, 2021

(87) PCT Pub. No.: WO2020/207568
PCT Pub. Date: Oct. 15, 2020

(65) Prior Publication Data
US 2022/0219349 A1  Jul. 14, 2022

(51) Int. Cl.
*B26D 7/00* (2006.01)
*A22C 25/16* (2006.01)
(Continued)

(52) U.S. Cl.
CPC ............ *B26D 7/2635* (2013.01); *A22C 25/16* (2013.01); *B26D 5/007* (2013.01); *B26D 7/0625* (2013.01);
(Continued)

(58) Field of Classification Search
CPC .. B26D 7/2635; B65D 5/007; B65D 2210/02; B65D 7/0625
(Continued)

(56) References Cited

U.S. PATENT DOCUMENTS 5,088,958 A    2/1992  Evers et al.
5,871,395 A *  2/1999  Grabau ................ A22C 25/166
                                          452/161
(Continued)

FOREIGN PATENT DOCUMENTS

CN    201385330 Y    1/2010
CN    201781909 U    4/2011
(Continued)

OTHER PUBLICATIONS

International Search Report dated Jan. 20, 2020; International Application No. PCT/EP2019/058971.

*Primary Examiner* — Richard T Price, Jr.
(74) *Attorney, Agent, or Firm* — DINSMORE & SHOHL LLP

(57) ABSTRACT

A cutting apparatus for cutting an essentially V-shaped strip from meat products fed in a transport direction has a knife carrier to which two knife units are assigned. Each knife unit has a circular knife and a drive for rotationally driving the circular knife about a central axis of rotation. The two circular knives are set substantially in a V-shape to each other in a position enclosing an angle. An adjustable arrangement of the knife units provides for setting of the size of the angle. The offset of the two central axes of rotation to each other is equal to zero in the transport direction and the two knife units are adjustable exclusively synchronously with each other. A corresponding apparatus and method for cutting an essentially V-shaped strip from meat products fed in transport direction is also provided.

17 Claims, 7 Drawing Sheets

(51) Int. Cl.
  *B26D 5/00*   (2006.01)
  *B26D 7/06*   (2006.01)
  *B26D 7/26*   (2006.01)
  *A22C 25/08*  (2006.01)
  *A22C 25/18*  (2006.01)

(52) U.S. Cl.
  CPC .............. *A22C 25/08* (2013.01); *A22C 25/18* (2013.01); *B26D 2210/02* (2013.01)

(58) Field of Classification Search
  USPC .......................................................... 452/162
  See application file for complete search history.

(56) References Cited

U.S. PATENT DOCUMENTS

| | | | |
|---|---|---|---|
| 6,280,313 B1* | 8/2001 | Braeger | A22C 25/16 452/161 |
| 9,125,424 B2 | 9/2015 | Jurs et al. | |
| 9,351,498 B2 | 5/2016 | Grimm et al. | |
| 10,051,872 B2 | 8/2018 | Finke et al. | |
| 10,251,405 B2 | 4/2019 | Zhou et al. | |
| 2013/0035023 A1 | 2/2013 | Jurs | |
| 2015/0216194 A1 | 8/2015 | Jurs | |
| 2015/0342202 A1 | 12/2015 | Grimm et al. | |
| 2020/0329723 A1 | 10/2020 | Jurs et al. | |
| 2022/0053784 A1 | 2/2022 | Rusko | |
| 2022/0142190 A1 | 5/2022 | Rusko | |

FOREIGN PATENT DOCUMENTS

| | | |
|---|---|---|
| CN | 102652516 A | 9/2012 |
| CN | 102783709 A | 11/2012 |
| CN | 104919273 A | 9/2015 |
| DK | 200400450 A | 9/2005 |
| EP | 3409125 A1 | 12/2018 |
| JP | S48000520 Y1 | 1/1973 |
| JP | H04330244 A | 11/1992 |
| JP | 2016505139 A | 2/2016 |
| TW | 129896 | 3/1990 |
| WO | 8910698 A1 | 11/1989 |
| WO | 2011151221 A1 | 12/2011 |
| WO | 2013159814 A1 | 10/2013 |
| WO | 2014016160 A2 | 1/2014 |
| WO | 2016169767 A1 | 10/2016 |
| WO | 2020207567 A1 | 10/2020 |
| WO | 2020207569 A1 | 10/2020 |

* cited by examiner

CUTTING APPARATUS FOR CUTTING A SUBSTANTIALLY V-SHAPED STRIP FROM MEAT PRODUCTS FED IN A TRANSPORT DIRECTION T AND METHOD AND APPARATUS FOR REMOVING A SUBSTANTIALLY V-SHAPED STRIP FROM MEAT PRODUCTS FED IN A TRANSPORT DIRECTION T HAVING SUCH A CUTTING APPARATUS

CROSS-REFERENCE TO RELATED APPLICATIONS

This application is the U.S. National Stage of PCT/EP2019/058971 filed Apr. 9, 2019, the content of which is incorporated herein by reference in its entirety.

FIELD OF THE INVENTION

The invention relates to a cutting apparatus, designed and configured for cutting an essentially V-shaped strip from meat products fed in the direction of transport T, having a knife carrier to which two knife units are assigned, each knife unit comprising a circular knife and a drive for rotationally driving the circular knife about a central axis of rotation $M_1$, $M_2$, the two circular knives being set substantially in a V-shape to each other in a position enclosing an angle $\alpha$ and it being possible to set the size of the angle $\alpha$ by an adjustable arrangement of the knife units on the knife carrier.

The invention also relates to an apparatus for removing essentially V-shaped strips from meat products fed in transport direction T, comprising a transport conveyor for transporting the meat products to be processed in transport direction T, means for detecting specific characteristics of the meat products, a cutting apparatus for cutting an essentially V-shaped strip from the meat product, and a control device for controlling the cutting apparatus as a function of the characteristics determined.

BACKGROUND OF THE INVENTION

The invention is further concerned with a method for removing essentially V-shaped strips from meat products fed in transport direction T, in particular with an apparatus according to claim 14, comprising the following steps: Transporting the meat products in transport direction T by means of a transport conveyor, detecting specific characteristics of the meat products using means for detecting the specific characteristics of the meat products, cutting of an essentially V-shaped strip from the meat product by means of a cutting apparatus having two circular knives, the two circular knives being set substantially in a V-shape to each other in a position enclosing an angle $\alpha$ and the size of the angle $\alpha$ being set as a function of the characteristics, the cutting apparatus being controlled by means of a control device when cutting the V-shaped strip as a function of the characteristics.

Such cutting apparatuses and apparatuses are used in the food processing industry in processes in which a preferably V-shaped strip is to be cut from a meat product. In particular when processing meat, which also expressly includes fish, such cutting apparatuses are used to cut product strips, for example, from a fish fillet lying on a transport surface or a transport conveyor. For this purpose, a relative movement takes place between the meat products to be processed and the cutting apparatus. It is possible for the meat product to be stationary, while the cutting apparatus, for example, is moved over the meat product as a hand-held device. Usually and preferably, however, the meat product is lying on a transport conveyor by means of which the meat product is transported in transport direction T, along a transport path on which the cutting apparatus (in transport direction) is fixedly positioned such that the cutting apparatus can be brought into operative connection with the meat product.

For example and usually, a rotationally driven conveyor belt, on which the meat products lie, preferably flat products, such as fish fillets or the like, is used as the transport conveyor. Using a means for determining specific characteristics of the products, these characteristics are determined before the products reach the cutting apparatus. The determination of characteristics means, for example, that strips of fat, strips with dark meat, bones or strips of bones or other undesirable strips, e.g. meat with blood spots or the like, are detected and determined, for example, in respect of size, position, distribution and orientation in the meat product. The determination usually takes place, for example, by means of camera, X-ray device, sensors, measuring arms or the like, the data/information collected being processed and evaluated by means of the control device in order to individually control the cutting apparatus accordingly based on the characteristics determined or as a function of the characteristics determined, and in particular also during execution of the cut. The cutting apparatus therefore plays a key role when removing the undesirable V-shaped strip.

With known cutting apparatuses, as disclosed in DK 2004 00450 L for example, the circular knives are arranged offset to each other one behind the other in transport direction T. In other words, the circular knives lie with their central axes of rotation one behind the other when viewed in transport direction T, such that the circular knives strike the meat product transported in transport direction T one after the other, i.e. with a time delay. Accordingly, this results in staggered cuts which means there is a risk of the position/location of the products changing during cutting. In other words, the spatially and chronologically staggered insertion of the circular knives into the meat product to be processed results in the products twisting on the transport conveyor, as a torque is applied to the product by the offset arrangement of the circular knives. This ultimately affects the incision and thus the cutting quality. Furthermore, in the known solution the circular knives can be pivoted independently of each other. On the one hand, this leads to the contact point B of the circular knives varying with regard to its position/location and that an asymmetrical V results due to different settings/adjustments of the circular knives. The contact point B of the circular knives is the point at which the two circular knives set in V-shape to each other or the planes $E_1$, $E_2$ defined by the circular knives intersect. Accordingly, it is not an actual contact point but the point of least distance. On the other hand, independent pivoting of the two circular knives is difficult to reproduce, such that the result of the adjustment depends on the operator in each case. A further disadvantage of the known cutting apparatus is that drives for adjusting the knife carrier and the knife units have to be arranged on the knife carrier itself, which ultimately means that additional masses also have to be moved.

SUMMARY OF THE INVENTION

The object of the invention is therefore to create a compact cutting apparatus which ensures symmetrical and precise cutting of the products. The object further consists of proposing a corresponding apparatus and a method.

This object is achieved by a cutting apparatus of the type referred to hereinbefore, in that the offset V of the two central axes of rotation $M_1$, $M_2$ to each other is equal to zero in transport direction T and the two knife units are designed and configured to be adjustable exclusively synchronously with each other. An offset V equal to zero expresses that the central axes of rotation $M_1$, $M_2$ of the two circular knives are offset-free in relation to the transport direction T, i.e. they are side by side at a distance considered equal to zero in the transport direction T, in such a manner that the circular knives strike the meat product to be processed synchronously and at the same time. Exclusively synchronously means that the two knife units are directly or indirectly coupled to or in operative connection with each other, such that equal and even adjustment of both knife units is always ensured with regard to time and control variable. Adjustment of one knife unit inevitably leads to adjustment of the other knife unit and vice versa. In this case, synchronously does not necessarily mean that the adjustment has to be made symmetrically, e.g. in relation to a vertical central axis or to the vertical axis of rotation D. This combination of features avoids the risk of twisting or displacing the meat products to be processed or at least greatly reduces the risk, resulting in symmetrical and precise cuts which can be reproduced at will.

In an especially preferred development, each knife unit is arranged on a separate positioning body for synchronous pivoting of both knife units, wherein each positioning body has a curved positioning rail with a gearing and the two positioning bodies with their curved positioning rails are mounted on the knife carrier with the respective gearings directed towards each other. Synchronous adjustment with constant contact point B of the circular knives is implemented in a particularly simple and contact manner by the positioning bodies with their curved positioning rails. This ensures the cutting of symmetrical V-incisions.

Advantageously, a common drive sprocket is arranged between the two curved positioning rails having the gearing, said drive sprocket being in operative connection with both positioning rails, wherein a drive is assigned to the drive sprocket. The drive sprocket can be driven in both directions with the drive, such that the angle α can be set precisely and synchronously for symmetrical cuts. The common, central drive sprocket necessarily ensures synchronicity when adjusting the knife units.

According to the invention, the two positioning bodies and thus the knife units have a common pivot central axis S. Due to the common pivot central axis S as the imaginary pivot axis, the contact point B of the circular knives is reliably and compulsorily held in the constant position, namely on the pivot central axis S.

A preferred embodiment is characterised in that the positioning bodies have bearing bodies with which the positioning bodies are guided along a curved path, the paths being arranged on the knife carrier. This embodiment ensures safe and precise setting of the angle α.

According to the invention, the radius of the curved paths corresponds to the radius of the curved positioning rails. This geometrical adjustment ensures the precise and synchronous pivoting of the two knife units in a particularly simple and safe manner.

Advantageously, the bearing bodies comprise four roller elements for each positioning body, of which two roller elements are guided on the upper side and two roller elements are guided on the lower side of the curved path.

This ensures safe and wobble-free mounting/guiding of the positioning bodies on the knife carrier for precise setting and adjustment of the angle α.

The contact point B of the two circular knives is preferably constant with respect to its position, irrespective of the size of the angle α. Especially preferably, the contact point B of the two circular knives is located on the pivot central axis S of the curved positioning rails and on the central axis M of the curved paths. This further reinforces the advantages already described.

A preferred development is characterised in that additional guide rollers are provided which are arranged on the knife carrier and rest on the positioning bodies and the positioning rails respectively which are on the side opposing the gearing. The term "rest on" refers not only to the contact between the guide rollers and the positioning rails but also guiding of the guide rollers at a small distance of the same to the positioning rails. This achieves safe and precise guiding of the positioning bodies and thus precise and symmetrical cutting of the products.

Especially advantageously, the circular knives may be driven independently of each other by means of their drives. This allows both the cutting speed and the directions of rotation of the two circular knives to be varied individually.

Especially preferably, the knife carrier is attached to a robotic mechanism which has a plurality of movement axes, in such a manner that the knife carrier is designed to be rotatable about a vertically directed axis of rotation D and/or to be vertically movable up and down perpendicular to the transport plane E and/or to be horizontally movable back and forth transverse to the transport direction T parallel to the transport plane E. A robotic arm, for example, may be used as the robotic mechanism. Other mechanisms, such as so-called delta robots or the like may also be used. Due to the cutting apparatus according to the invention, i.e. the combination of the cutting apparatus with a robotic mechanism, the individual cuts can be carried out simply and precisely, such that symmetrical V-cuts are reproducibly guaranteed.

Especially preferably, the robotic mechanism additionally has a shaft for driving the drive sprocket, the drive for the drive sprocket being assigned to the shaft. As a result, all (positioning) drives have a fixed frame mounting, i.e. they are not arranged on the knife carrier itself, so that less mass has to be moved.

The object is also achieved by an apparatus of the type referred to hereinbefore in that the cutting apparatus is designed and configured as described herein.

The object is further achieved by a method having the steps referred to hereinbefore in that the two circular knives strike the meat product transported in transport direction T at the same time, in such a manner that cutting of the meat product is performed simultaneously by both circular knives, and that setting of the size of the angle α takes place exclusively by the synchronous adjustment of both circular knives.

The advantages arising from this have already been described in connection with the cutting apparatus, which is why reference is made to the relevant passages to avoid repetitions.

DETAILED DESCRIPTION OF THE DRAWINGS

Further expedient and/or advantageous features and developments of the cutting apparatus and the apparatus and method for removing essentially V-shaped strips from meat products fed in transport direction T are disclosed herein.

Especially preferred embodiments of the cutting apparatus and the apparatus are explained in greater detail with reference to the attached drawing. The drawing shows:

DETAILED DESCRIPTION OF THE INVENTION

Figure 1:
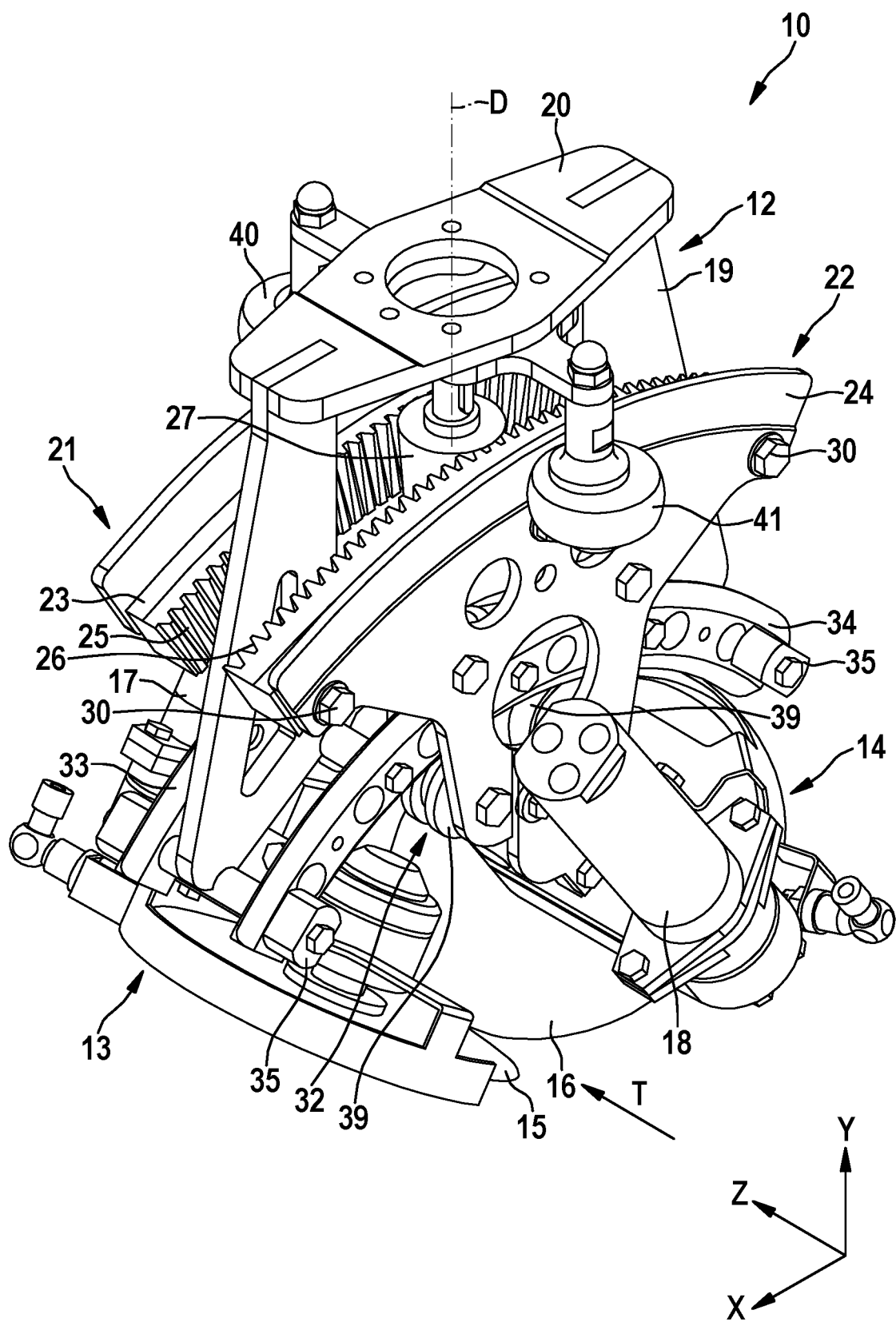
FIG. 1 is a schematic illustration of a cutting apparatus in a perspective view obliquely from above and the front.

The cutting apparatus shown in the drawing is used for removing dark meat strips (the so-called dark meat) from skinned fish fillets, e.g. in pink salmon or tuna fish. However, the cutting apparatus according to the invention is used in the same manner for removing strips of fat or strips of bones or strips of meat or other undesirable strips of product from other meat products, such as poultry or the like.

The cutting apparatus 10 shown is designed and configured for cutting an essentially V-shaped strip 50 from meat products 11 fed in direction of transport T and has a knife carrier 12 to which two knife units 13, 14 are assigned, each knife unit 13, 14 comprising a circular knife 15, 16 and a drive 17, 18 for rotationally driving the circular knife 15, 16 about a central axis of rotation $M_1$, $M_2$, the two circular knives 15, 16 being set substantially in a V-shape to each other in a position enclosing an angle $\alpha$ and it being possible to set the size of the angle $\alpha$ by an adjustable arrangement of the knife units 13, 14 on the knife carrier 12.

Figure 5:
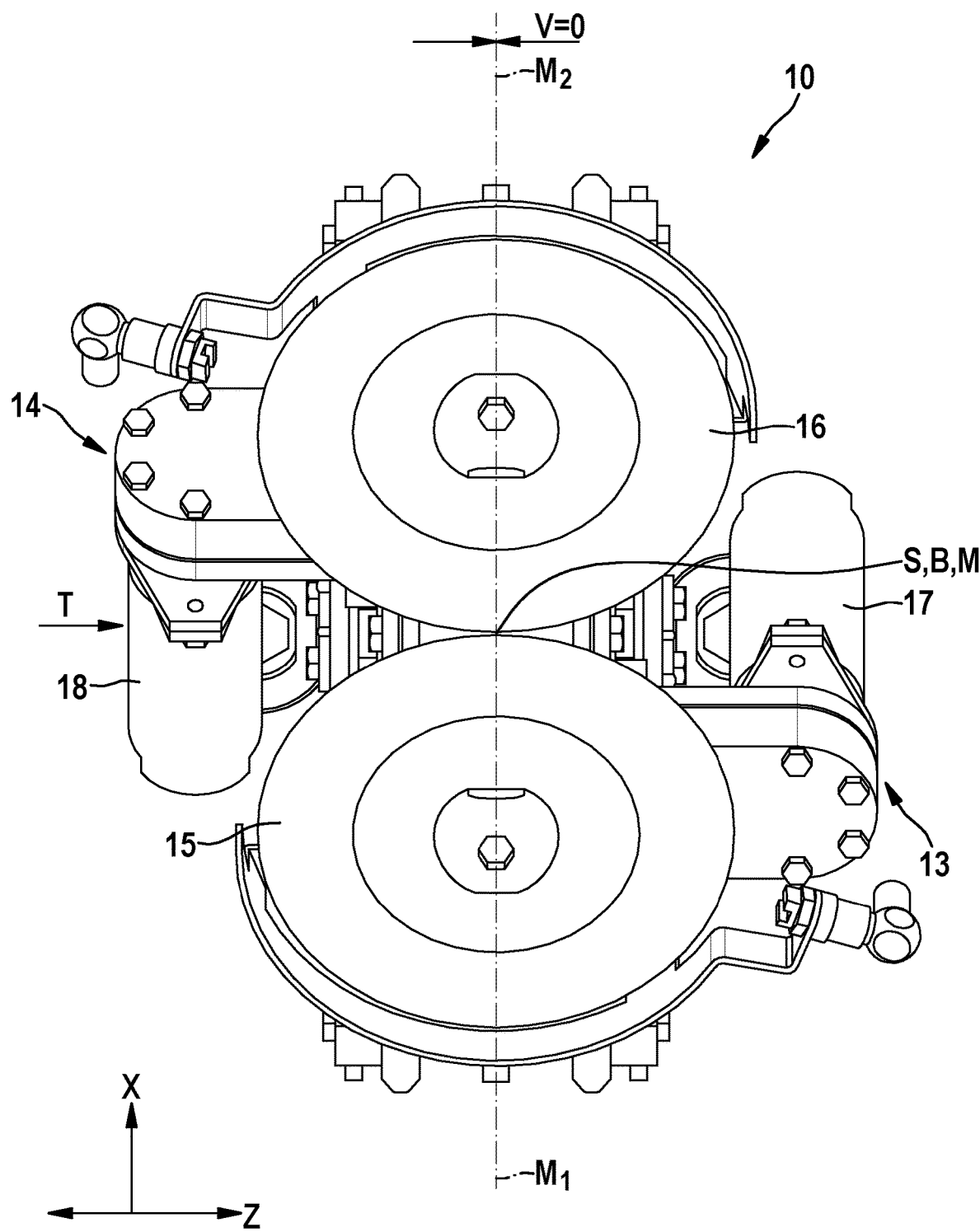
FIG. 5 is a view from below of the cutting apparatus according to FIG. 1.
Figure 6:
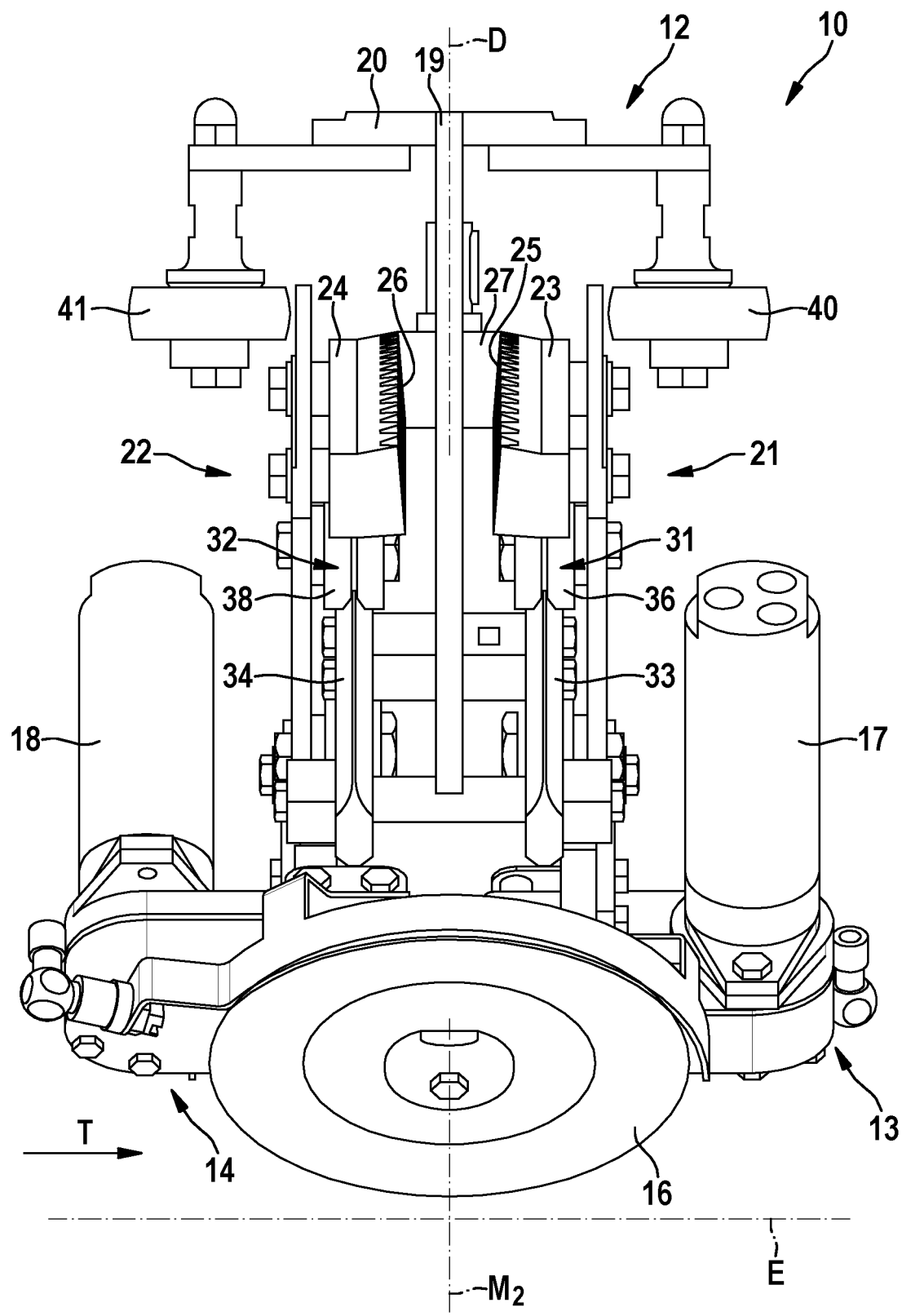
FIG. 6 is a lateral view of the cutting apparatus according to FIG. 1.
Figure 7:
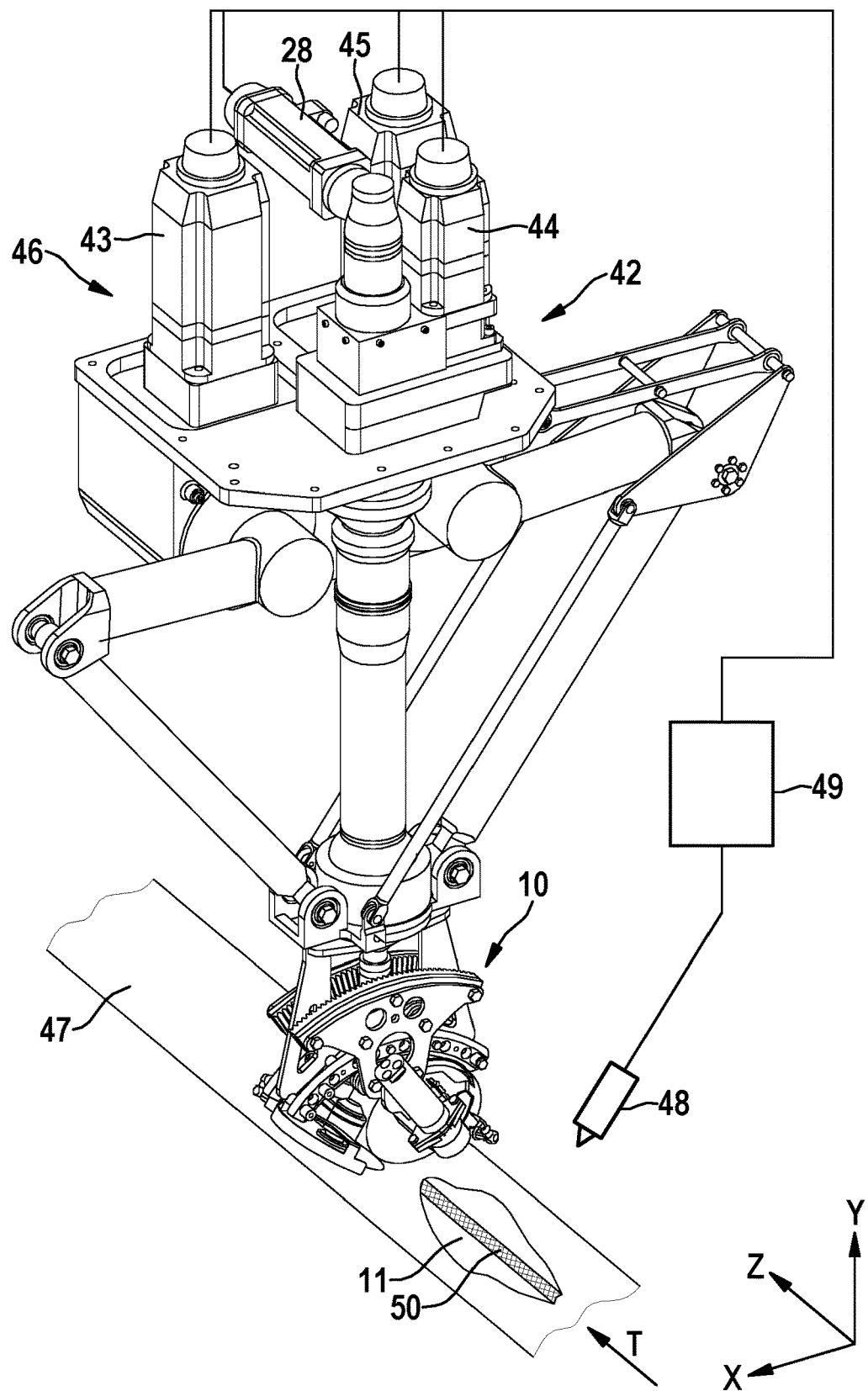
FIG. 7 is a view of the cutting apparatus according to FIG. 1, arranged on a robotic mechanism.

This cutting apparatus 10 is characterised according to the invention in that the offset V of the two central axes of rotation $M_1$, $M_2$ to each other is equal to zero in transport direction T and the two knife units 13, 14 are designed and configured to be adjustable exclusively synchronously with each other. The offset-free arrangement of the two central axes of rotation $M_1$, $M_2$ emerges in particular from FIG. 5. In their basic position, the two central axes of rotation $M_1$, $M_2$ are located side by side on one axis, this axis being aligned, in an idealised sense, transversely to the transport direction T. The synchronous adjustability of the two knife units 13, 14 expresses that a single knife unit 13, 14 cannot be adjusted without the other knife unit 13, 14.

When taken on their own or in combination with each other, the features and developments described below illustrate preferred embodiments. It is expressly pointed out that features which are summarised in the claims and/or the description and/or the drawing or are described in a common embodiment can also further develop the cutting apparatus 10 described above in a functionally independent manner.

Figure 2:
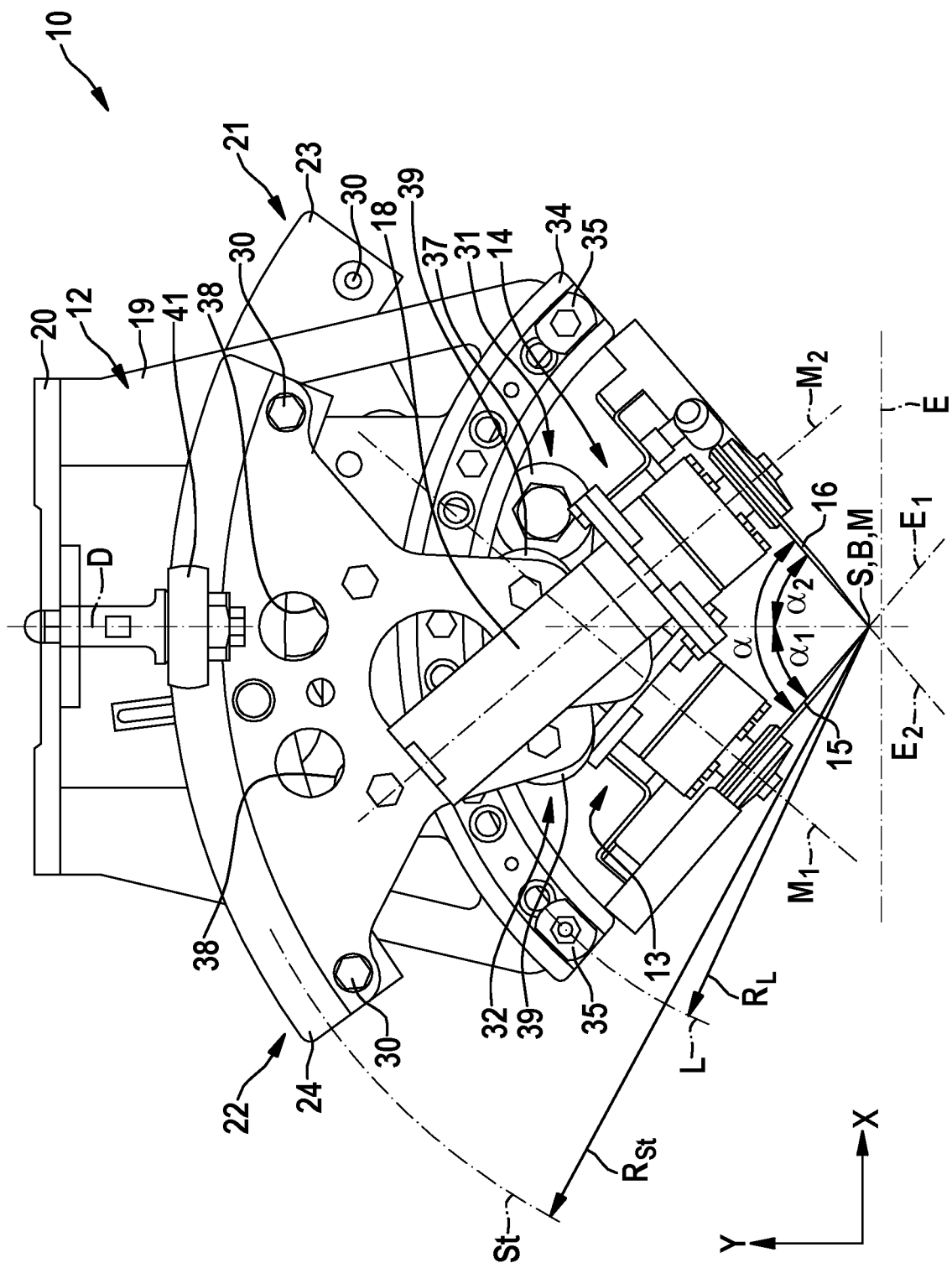
FIG. 2 is a front view of the cutting apparatus according to FIG. 1 viewed in transport direction T with a steep position of the circular knives (small angle $\alpha$)
Figure 3:
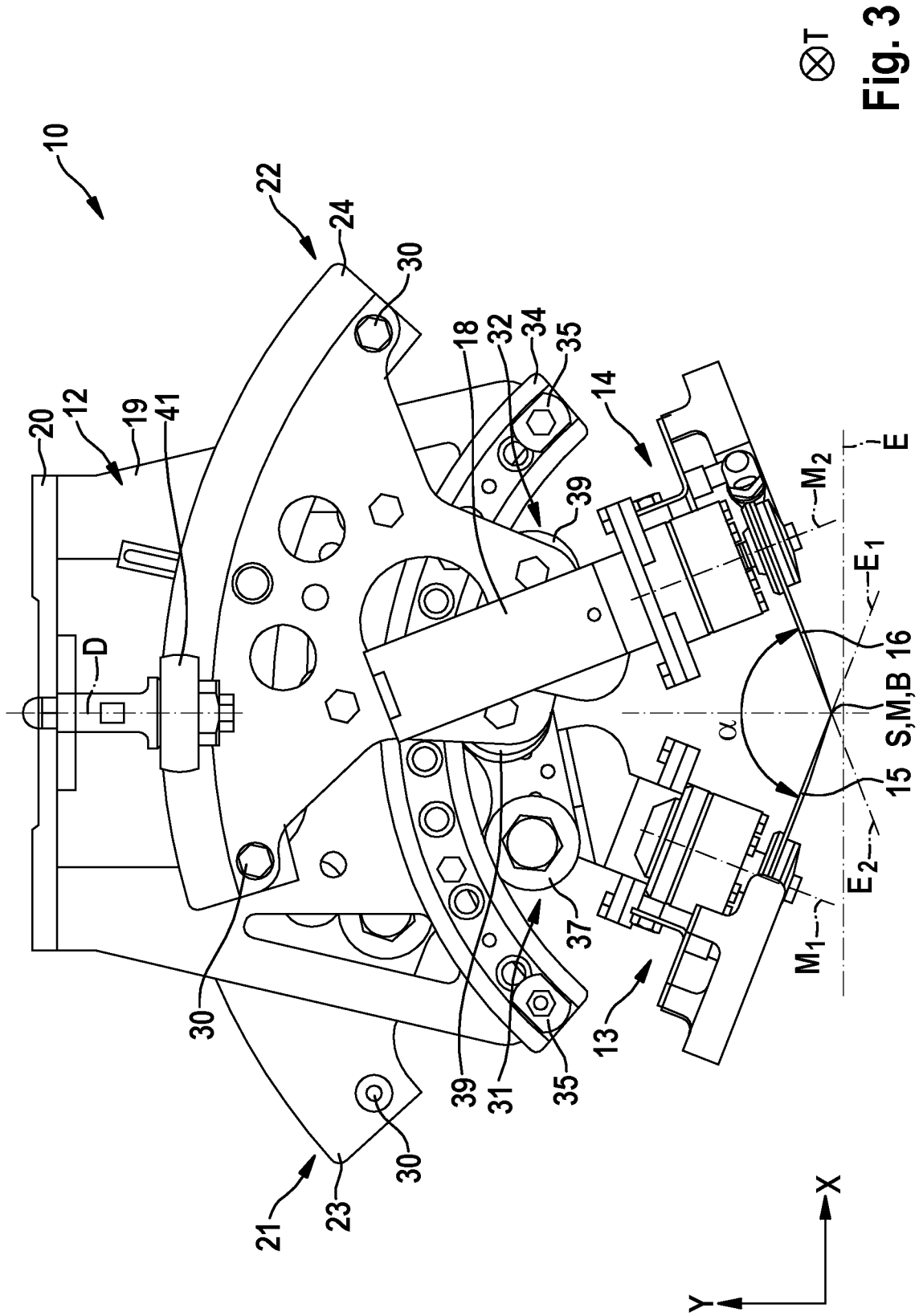
FIG. 3 is a front view of the cutting apparatus according to FIG. 1 viewed in transport direction T with a shallow position of the circular knives (large angle $\alpha$)
Figure 4:
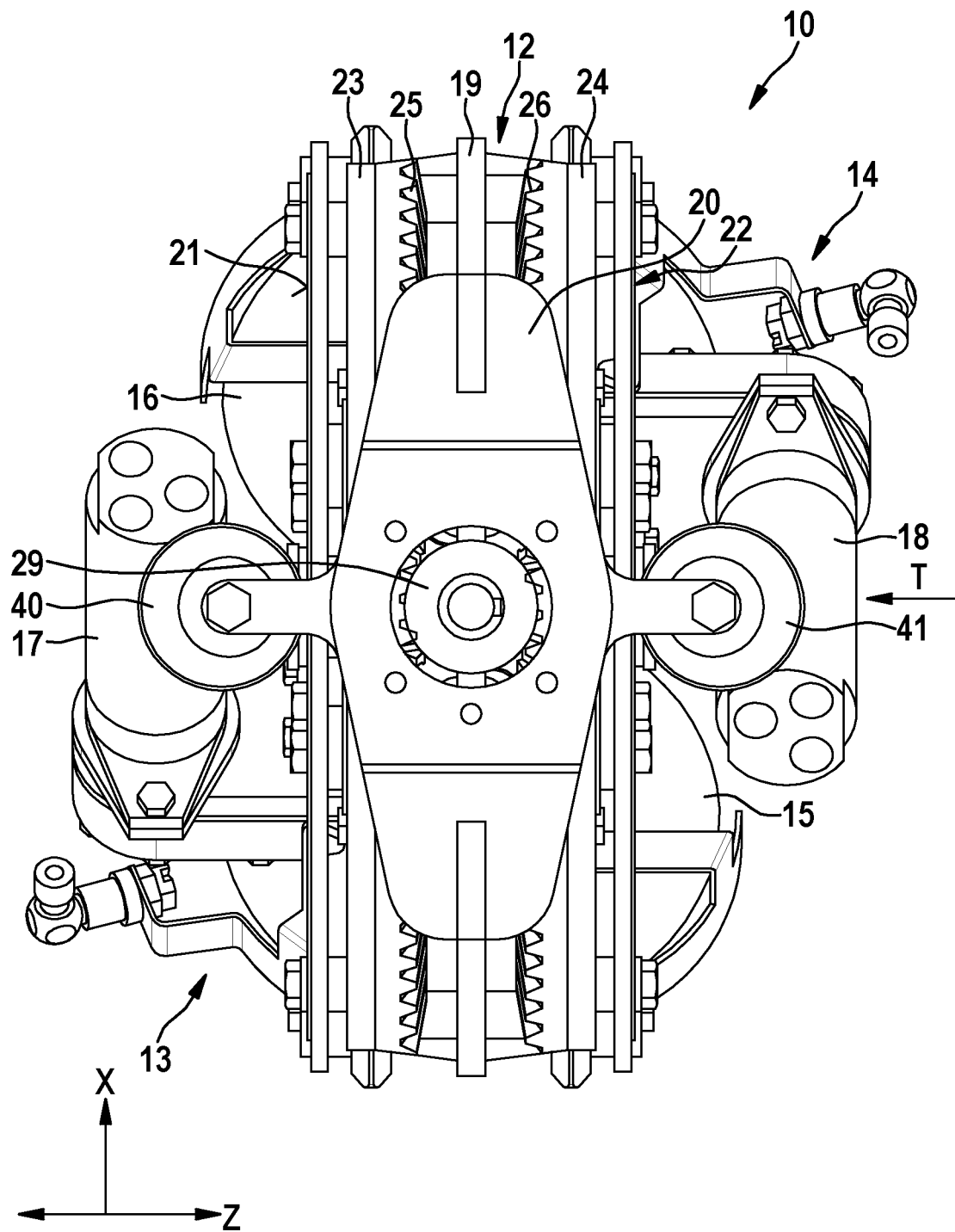
FIG. 4 is a top view of the cutting apparatus according to FIG. 1.

Especially preferably, the two circular knives 15, 16 are always and in every position (see in particular FIGS. 2 and 3) symmetrical to the axis of rotation D of the knife carrier 12. In this case, the angle $\alpha$ is divided equally into $\alpha_1 = \alpha_2$. The axis of rotation D thus forms the angle bisector for the angle $\alpha$. Optionally, the two circular knives 15, 16 may also be aligned asymmetrically to the axis of rotation D. That is $\alpha_1$ does not equal $\alpha_2$. The synchronous adjustment to the angle bisector, which is then no longer formed by the axis of rotation D, remains unaffected by this.

In the embodiment illustrated, the knife carrier 12 is a flat profile 19 with a carrier plate 20. However, other designs of the knife carrier 12, e.g. in the form of a frame or the like, can also be used. The knife units 13, 14, which are arranged on the knife carrier 12 and are preferably releasably mounted, comprise a circular knife 15, 16 each and a drive 17, 18 each. The drives 17, 18 for the circular knives 15, 16 may be, for example, compressed air motors or electric motors. The power transmission from drive 17, 18 to the circular knives 15, 16 may take place, for example, via toothed belts or gear trains. However, other drive concepts and gearing concepts can also be used.

Due to the adjustable arrangement of the knife units 13, 14 on knife carrier 12, the angle $\alpha$ is adjustable, preferably between 170 degrees and 45 degrees, especially preferably between 160 degrees and 85 degrees. The adjustment is preferably implemented steplessly. The diameter of the circular knives 15, 16 is chosen as small as possible in order to reduce the effect in the meat product 11 of moving and/or twisting the meat product 11 when the circular knives 15, 16 are pivoted.

Optionally, each knife unit 13, 14 is arranged on a separate positioning body 21, 22 for synchronous pivoting of both knife units 13, 14, each positioning body 21, 22 having a curved positioning rail 23, 24 with a gearing 25, 26 and the two positioning bodies 21, 22 with their curved positioning rails 23, 24 being mounted on the knife carrier 12 with the respective gearings 25, 26 directed towards each other. In this embodiment, the knife carrier 12 is in a sandwich-like arrangement between the two positioning bodies 21, 22. The knife units 13, 14 are releasably mounted, e.g. by means of screws on the positioning body 21, 22. Instead of the positioning rails 23, 24 with the gearings 25, 26, other positioning mechanisms, e.g. toothed wheel structures or positioning levers or the like, may also be used.

A common drive sprocket 27 is arranged between the two curved positioning rails 23, 24 having the gearing 25, 26, said drive sprocket being in operative connection with both positioning rails 23, 24, wherein a drive 28 is assigned to the drive sprocket 27. The drive 28 may be connected directly to the drive sprocket 27, or indirectly, e.g. via a toothed belt or gear trains. In a preferred development, which is described below, the drive 28 is connected to the drive sprocket 27 via a shaft 29 for power transmission. The gearing of the drive sprocket 27 engages directly in the gearing 25, 26 of the positioning rails 23, 24. The positioning rails 23, 24 are releasably mounted on the positioning body 21, 22, e.g. by means of screws 30. This allows easy replacement of the positioning rails 23, 24, e.g. in case of wear or for different gearings with modified pitches.

The two positioning bodies 21, 22 and thus the knife units 13, 14 have a common pivot central axis S. The pivot central axis S can be seen in particular in FIGS. 2 and 3. The circular knives 15, 16 are adjusted synchronously due to the common pivot central axis S. The pivot central axis S coincides with the contact point B of the two circular knives 15, 16. In other words, the contact point B of the circular knives 15, 16 is located on the pivot central axis S. The contact point B of the two circular knives 15, 16 is the point of the smallest distance which just prevents a collision of the two circular knives 15, 16. Pivot central axis S and contact point B are independent of the position of the circular knives 15, 16 with regard to their position/location and they are therefore constant irrespective of the size of the angle α and, in the embodiment shown, lie on the axis of rotation D of the cutting apparatus 10 (see in particular FIGS. 2 and 3).

As mentioned, the positioning bodies 21, 22 are mounted on the knife carrier 12. For this purpose, the positioning bodies 21, 22 have bearing bodies 31, 32 with which the positioning bodies 21, 22 are guided along a curved path 33, 34, said curved paths 33, 34 being arranged on the knife carrier 12. The curved paths 33, 34 are preferably releasably mounted on the knife carrier 12, e.g. by means of screws 35. The knife carrier 12 in turn is in a sandwich-like arrangement between the paths 33, 34. The curvature of the curved paths 33, 34 corresponds to the curvature of the curved positioning rails 23, 24, The curve paths St and L accordingly run parallel to each other. Starting from the pivot central axis S, the radius of the positioning rails 23, 24 is $R_{St}$, while the radius of the paths 33, 34 starting from a central axis M is $R_L$, where $R_{St} > R_L$ (see in particular FIG. 2). The contact point B of the two circular knives 15, 16 is located on both the pivot central axis S of the curved positioning rails 23, 24 and on the central axis M of the curved paths 33, 34.

Each bearing body 31, 32 comprises four roller elements 36, 37; 38, 39 for each positioning body 21, 22, of which two roller elements 36, 38 are guided on the upper side and two roller elements 37, 39 are guided on the lower side of the curved paths 33, 34. The positioning bodies 21, 22 are mounted and guided safely and precisely on the knife carrier 12 due to the number and arrangement of the roller elements 36, 37; 38, 39. The roller elements 36, 37; 38, 39 are preferably releasably mounted, e.g. by means of screws, on the positioning body 21, 22. Optionally, additional guide rollers 40, 41 are provided. The guide rollers 40, 41 are preferably arranged on the knife carrier 12, e.g. in the region of the carrier plate 20. The guide rollers 40, 41 rest on the positioning bodies 21, 22 and the positioning rails 23, 24 respectively which are on the side opposing the gearing 25, 26, where guiding with a small distance of the guide rollers 40, 41 from the positioning rails 23, 24 is described as "resting on". The number of roller elements 36 to 39 may also vary. For example, two roller elements may be guided on the upper side of the paths 33, 34 and one roller element on the lower side of paths 33, 34 or vice versa. For example, plain bearings may also be used instead of the roller elements 36 to 39.

It has already been described above that a drive 17, 18 is assigned to each circular knife 15, 16. As a result, the circular knives 15, 16 can be driven independently of each other by means of their drives 17, 18. This allows the circular knives 15, 16 to be driven in the same direction or preferably in opposite directions. The drive speed may also be selected to be different. However, the drive speed is preferably selected to be identical for both circular knives 15, 16.

The cutting apparatus 10 preferably has a suction unit (not explicitly shown) for extracting the strips 50 cut from the meat product 11. The suction unit includes, among other things, a suction pipe which is directed with its suction opening approximately at the contact point B of the circular knives 15, 16 and a vacuum unit to which the suction pipe is connected.

Especially preferably, the knife carrier 12 is attached to a robotic mechanism 42 which has a plurality of movement axes, in such a manner that the knife carrier 12 is designed to be rotatable about a vertically directed axis of rotation D and/or to be vertically movable up and down perpendicular to the transport plane E (in Y direction, e.g. according to FIGS. 2 and 3) and/or to be horizontally movable back and forth transverse to the transport direction T parallel to the transport plane E (in X direction, e.g. according to FIGS. 2 to 5). The robotic mechanism 42 comprises a plurality of drives 43, 44, 45 for executing the adjusting movement for positioning the cutting apparatus 10 along the movement axes. In addition, the robotic mechanism 42 may also comprise the drive 28, by means of which the shaft 29 for driving the drive sprocket 27 is driven for the adjusting movement of the knife units 13, 14. The knife carrier 12 may also be arranged on a serial positioning mimic or a parallel kinematics mechanism, for example to implement an additional movement in transport direction T (Z direction).

As already mentioned, the cutting apparatus 10 may be used as an individual component. However, the cutting apparatus 10, in the manner described above, i.e. with or without robotic mechanism 42, is preferably part of an apparatus 46 for removing essentially V-shaped strips 50 from meat products 11 fed in transport direction T, comprising a transport conveyor 47 for transporting the meat products 11 to be processed in transport direction T, means 48 for detecting specific characteristics of the meat products 11, a cutting apparatus 10 for cutting an essentially V-shaped strip 50 from the meat product 11, and a control device 49 for controlling the cutting apparatus 10 as a function of the characteristics determined.

The apparatus 46 is characterised according to the invention in that the cutting apparatus 10 is designed and configured according to the preceding description of cutting apparatus 10 in different embodiments.

The transport conveyor 47 is preferably a rotationally driven conveyor belt. The conveyor belt is intermittently or preferably continuously driven by means of the drive which is not shown. The meat products 11 are aligned with their longitudinal extension in transport direction T, in such a manner that the strips 50 to be removed, the strips 50 of dark meat to be removed running e.g. in the case of pink salmon or tuna fish in the longitudinal extension of the fillets, are also aligned approximately in transport direction T. The meat products 11 are fed to the cutting apparatus 10 in this orientation. The means 48 for detecting the specific characteristics of the meat products 11 is arranged upstream of the cutting apparatus 10 in transport direction T.

The determination of characteristics means, for example, that strips of fat, strips 50 with dark meat, bones or strips of bones or other undesirable strips, e.g. meat with blood spots or the like, are detected and determined, for example, in respect of size, position, distribution and orientation in the meat product. The determination usually takes place, for example, by means of camera, X-ray device, sensors, measuring arms or the like, the data/information collected being processed and evaluated by means of the control apparatus 49 in order to individually control the cutting apparatus 10 accordingly based on the characteristics determined or as a function of the characteristics determined, and in particular also during execution of the cut.

The robotic mechanism 42 is preferably attached to a housing or a frame. Accordingly, in the preferred embodiment, all drives 43, 44, 45 and 28 for positioning the cutting apparatus 10 on the one hand, and for adjusting the knife units 13, 14 on the other hand, are arranged with a fixed frame mounting. All drives 43 to 45 and 28 are preferably connected to the control device 49 which optionally may also include an evaluation unit and/or a memory unit. The means 48 for detecting the characteristics is also connected to the control device 49. In addition, there is still the possibility of the drive for the transport conveyor 47 also being connected to the control device 49.

The method according to the invention is explained in greater detail below based on the drawing:

The method is used for removing essentially V-shaped strips 50 from meat products 11 fed in transport direction T. Especially preferably, the method is used for removing/cutting out a strip 50 of dark meat from a fish fillet. The method comprises the following steps:

The meat products 11 are transported in transport direction T by means of a transport conveyor 47. For this purpose, the meat products 11 lie flat on the transport conveyor 47 and are transported with their longitudinal extension in transport direction T. During transport, the meat products 11 are guided along below a means 48 for detecting the specific characteristics of the meat products 11. The specific characteristics of the meat products 11 are determined using the means 48. Subsequently, an essentially V-shaped strip 50 is cut from the meat product 11 by means of a cutting apparatus 10 having two circular knives 15, 16, the two circular knives 15, 16 being set substantially in a V-shape to each other in a position enclosing an angle α and the size of the angle α being set as a function of the characteristics. The setting may take place before and/or during the cut. Accordingly, when cutting the V-shaped strip 50, the cutting apparatus 10 is controlled by means of a control device 49 as a function of the characteristics determined.

The method is characterised according to the invention in that the two circular knives 15, 16 strike the meat product 11 transported in transport direction T at the same time, in such a manner that cutting of the meat product 11 is performed simultaneously by both circular knives 15, 16, and that setting of the size of the angle α takes place exclusively by the synchronous adjustment of both circular knives 15, 16. Finally, the two knife units 13, 14 and the circular knives 15, 16 respectively are coupled to each other by means of the common drive sprocket 47, such that synchronous adjustment is necessarily ensured. This excludes individual and independent adjustment of separate circular knives 15, 16.

Especially preferably, the method is carried out with the apparatus 46 as disclosed, in which a cutting apparatus 10 as disclosed herein is used.

The invention claimed is:

1. A cutting apparatus, designed and configured for cutting an essentially V-shaped strip from meat products fed in a transport direction, comprising:
   a knife carrier having two knife units, each knife unit comprising;
      a circular knife and a drive for rotationally driving the circular knife about a central axis of rotation;
      the two circular knives being set substantially in a V-shape to each other in a position enclosing an angle α; and
      the knife units having an adjustable arrangement for setting a size of the angle α on the knife carrier;
   wherein an offset of the two central axes of rotation to each other is equal to zero in the transport direction and the two knife units are adjustable exclusively synchronously with each other.

2. The cutting apparatus according to claim 1, further comprising:
   two separate positioning bodies;
   each knife unit arranged on one of the separate positioning bodies for synchronous pivoting of both knife units;
   wherein each positioning body has a curved positioning rail with a gearing, the two positioning bodies with their curved positioning rails are mounted on the knife carrier with the respective gearings directed towards each other.

3. The cutting apparatus according to claim 2, further comprising a common drive sprocket arranged between the two curved positioning rails having the gearing, said drive sprocket being in operative connection with both positioning rails, wherein a drive is assigned to the drive sprocket.

4. The cutting apparatus according to claim 2, wherein the two positioning bodies and thus the knife units have a common pivot central axis S.

5. The cutting apparatus according to claim 2, wherein the positioning bodies each have a bearing body with which the positioning bodies are guided along a curved path, the paths being arranged on the knife carrier.

6. The cutting apparatus according to claim 5, wherein a curvature of the curved paths corresponds to a curvature of the curved positioning rails.

7. The cutting apparatus according to claim 5, wherein the bearing bodies each comprise four roller elements for each positioning body, two of the roller elements of each bearing body being guided on an upper side and two of the roller elements of each bearing body being guided on a lower side of the curved path.

8. The cutting apparatus according to claim 5, wherein a contact point of the two circular knives is constant with respect to its position, irrespective of the size of the angle α.

9. The cutting apparatus according to claim 8, wherein the contact point B of the two circular knives is located on a pivot central axis S of the curved positioning rails and on a central axis of the curved paths.

10. The cutting apparatus according to claim 2, further comprising additional guide rollers arranged on the knife carrier and resting on the positioning bodies and the positioning rails respectively, each additional guide roller being on a side of the respective positioning rail opposing the gearing.

11. The cutting apparatus according to claim 1, wherein the circular knives are driven independently of each other by means of their drives.

12. The cutting apparatus according to claim 1, further comprising:
   a robotic mechanism having a plurality of movement axes;
   the knife carrier being attached to the robotic mechanism such that the knife carrier is rotatable about a vertically directed axis of rotation and/or is vertically movable up and down perpendicular to a transport plane and/or is horizontally movable back and forth transverse to the transport direction parallel to the transport plane.

13. The cutting apparatus according to claim 12, wherein the robotic mechanism comprises a shaft for driving a drive sprocket, the drive for the drive sprocket being assigned to the shaft.

14. An apparatus for removing essentially V-shaped strips from meat products fed in a transport direction, comprising:
   a transport conveyor for transporting the meat products to be processed in the transport direction T;
   a detector operable to detect specific characteristics of the meat products;
   a cutting apparatus for cutting an essentially V-shaped strip from the meat product; and
   a control device for controlling the cutting apparatus as a function of the characteristics detected;
   wherein the cutting apparatus comprises the cutting apparatus of claim 1.

15. The apparatus according to claim 14, wherein the detector comprises a camera, an X-ray device, sensors, or measuring arms.

16. A method for removing essentially V-shaped strips from meat products fed in a transport direction, comprising the following steps:
- transporting the meat products in the transport direction by means of a transport conveyor;
- detecting specific characteristics of the meat products using a detector operable to detect the specific characteristics of the meat products;
- cutting of an essentially V-shaped strip from the meat product by means of a cutting apparatus having two circular knives, wherein the two circular knives are set substantially in a V-shape to each other in a position enclosing an angle $\alpha$ and the size of the angle $\alpha$ is set as a function of the characteristics;
- wherein when cutting the V-shaped strip, the cutting apparatus is controlled by means of a control device as a function of the characteristics detected;
- wherein the two circular knives strike the meat product transported in transport direction T at the same time, in such a manner that cutting of the meat product is performed simultaneously by both circular knives; and
- wherein setting of the size of the angle $\alpha$ takes place exclusively by a synchronous adjustment of both circular knives.

17. The method according to claim 16, wherein the detector used in the detecting step comprises a camera, an X-ray device, sensors, or measuring arms.

\* \* \* \* \*